United States Patent [19]

Speckhart

[11] 4,252,422
[45] Feb. 24, 1981

[54] ADJUSTABLE SPECTACLE NOSEPIECE

[76] Inventor: Stephen Speckhart, 78 Lexington Ave., Maplewood, N.J. 07040

[21] Appl. No.: 26,585

[22] Filed: Apr. 4, 1979

[51] Int. Cl.³ .............................................. G02C 5/12
[52] U.S. Cl. ........................................ 351/137; 2/13; 351/88; 351/128
[58] Field of Search ................. 2/443, 13, 15, 10, 426; 351/88, 128, 132, 137, 138

[56] References Cited

U.S. PATENT DOCUMENTS

| | | | |
|---|---|---|---|
| 2,108,074 | 2/1938 | McMahon | 351/128 |
| 2,370,843 | 3/1945 | Croninger | 351/132 |
| 2,410,584 | 11/1946 | Jencks | 351/88 |
| 2,471,063 | 5/1949 | Devoe | 351/132 |
| 3,209,755 | 10/1965 | McCarthy et al. | 351/132 |
| 3,923,385 | 12/1975 | Ahern | 351/138 |
| 4,045,137 | 8/1977 | Bradley | 351/137 |
| 4,070,104 | 1/1978 | Rice | 351/132 |

*Primary Examiner*—John K. Corbin
*Assistant Examiner*—B. W. de los Reyes
*Attorney, Agent, or Firm*—B. P. Fishburne, Jr.

[57] ABSTRACT

To promote comfort and customized fitting of spectacles on individual wearers, an adjustable nosepiece formed of a thermoplastic is assembled with a nosepiece suspension frame by the optometrist after customizing the suspension frame for securement to either metal or plastic frame spectacles. The nosepiece can be heated by the optometrist for final shaping to individual nose contours and the nosepiece mounting lugs are pinched to secure the nosepiece in a selected adjusted position.

3 Claims, 7 Drawing Figures

U.S. Patent  Feb. 24, 1981  4,252,422
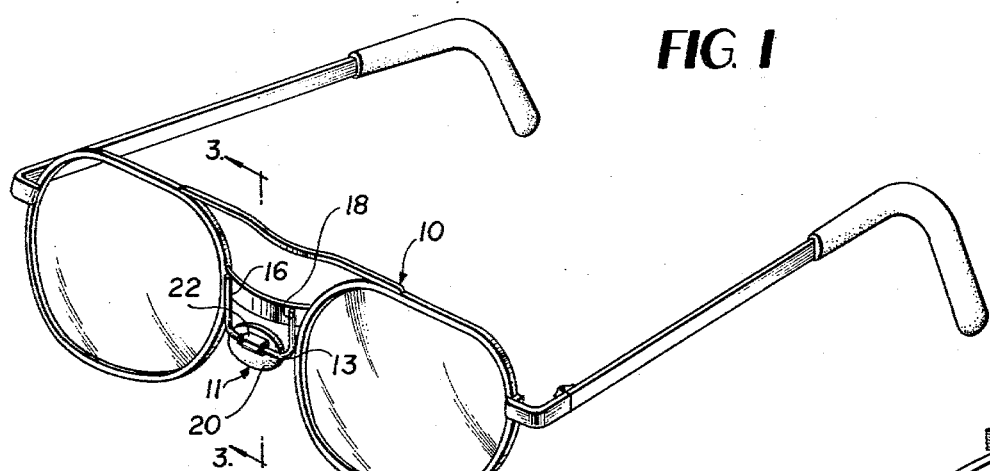
FIG. 1
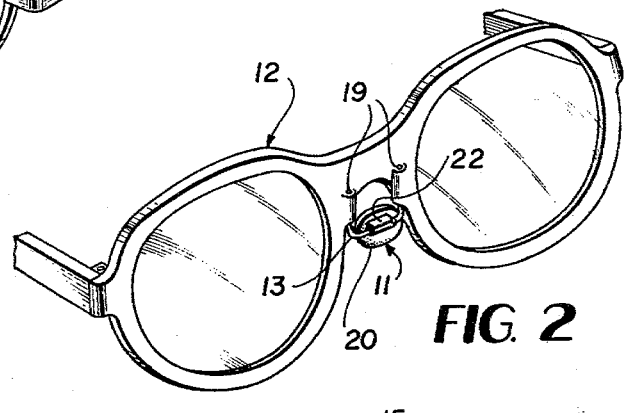
FIG. 2
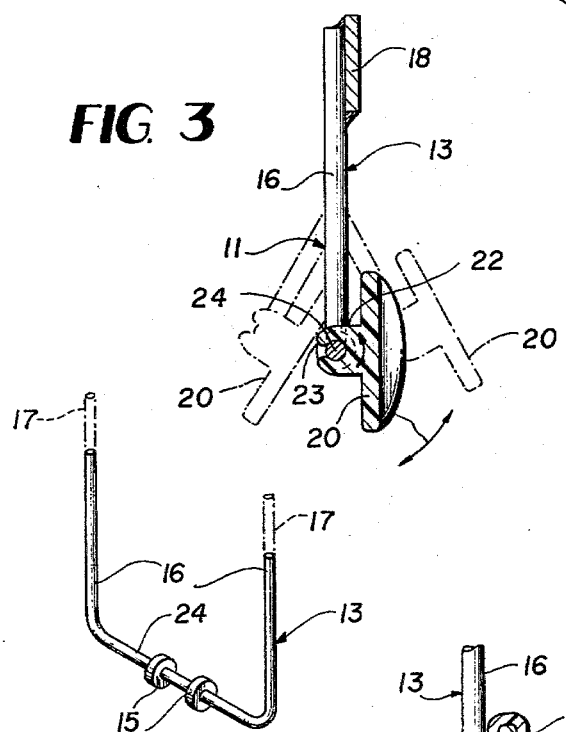
FIG. 3
FIG. 5
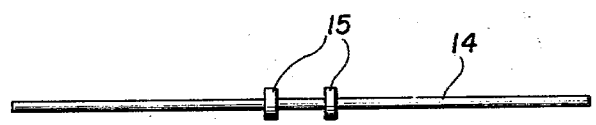
FIG. 4
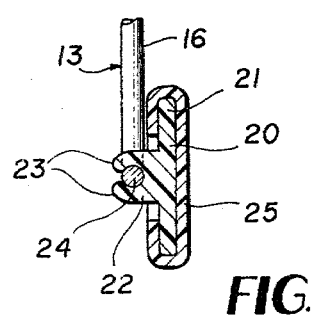
FIG. 7
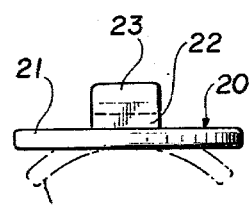
FIG. 6

ADJUSTABLE SPECTACLE NOSEPIECE

BACKGROUND OF THE INVENTION

Adjustable spectacle nosepieces and nosepiece attaching means are known in the prior art, broadly speaking. Examples of the known prior art made of record herein under 37 C.F.R. 1.56 are U.S. Pat. Nos. 3,923,385; 4,032,223; 4,045,137 and 4,070,104.

The present invention seeks to improve on these prior art structures in terms of economy of manufacturing and simplicity and also in providing a comfort nosepiece for spectacles which may be custom installed by an optometrist on either metal frame or plastic frame spectacles to enable the wearer to experience the best possible fit and comfort particularly where the spectacles engage and rest upon the bridge of the nose. It is a well known fact that the nose-engaging elements of present day spectacles are most troublesome in terms of stability of the spectacles on the wearer, comfort and security.

In accordance with this invention, a basic adjustable thermoplastic nosepiece or pad is provided which can be custom-shaped by the optometrist and custom-adjusted on a support frame which mounts the nosepiece to the frame of the spectacles. The nosepiece can be fixed or locked in the optimum adjusted position at the time of installation and fitting. The nosepiece suspension frame is likewise provided in a basic stock length and is custom cut and shaped by the optometrist at the time of installation on the spectacles. The resulting construction provides an ideal nosepiece arrangement for any type of spectacle frame and for any wearer of spectacles, regardless of anatomical variation.

Other features and advantages of the invention will become apparent during the course of the following description.

BRIEF DESCRIPTION OF THE DRAWINGS

FIG. 1 is a perspective view of the invention applied to metal frame spectacles.

FIG. 2 is a similar view of the invention applied to plastic frame spectacles.

FIG. 3 is an enlarged vertical section taken on line 3—3 of FIG. 1 and showing in phantom lines the adjustability of the nosepiece suspension frame.

FIG. 4 is a plan view of the basic suspension frame unit prior to forming and trimming.

FIG. 5 is a perspective view of the frame after forming and trimming.

FIG. 6 is a plan view of a thermoplastic nosepiece prior to shaping to fit the nose of the wearer.

FIG. 7 is a vertical cross section through the nosepiece showing an optional removable and washable cushion boot.

DETAILED DESCRIPTION

Referring to the drawings in detail wherein like numerals designate like parts, the numeral 10, FIG. 1, designates conventional metal frame spectacles having a customized nosepiece 11 provided thereon in accordance with this invention. FIG. 2 illustrates the same nosepiece 11 applied to a plastic frame spectacles 12.

Continuing to refer to the drawings, the customized adjustable nosepiece assembly comprises a nosepiece suspension frame 13, FIG. 5, which is custom-shaped from an initially straight standard length stock piece 14 formed of appropriate wire stock and having a pair of spaced stop collars 15 fixed thereon near the longitudinal center thereof.

As shown in FIGS. 1, 3 and 5, the installing optometrist custom forms the suspension frame 13 from the straight stock piece 14 by bending a pair of parallel upright arms 16 on the opposite ends thereof in properly spaced relationship to fit a given pair of spectacles. The arms 16 are trimmed to proper lengths by the optometrist as indicated at 17, FIG. 5, and in the case of metal frame spectacles, the two arms 16 are soldered to the forward side of the spectacle frame bridge bar 18, FIGS. 1 and 3. In the case of plastic frame spectacles, FIG. 2, the preformed and trimmed arms 16 are inserted upwardly into provided parallel bores 19 of the plastic frame. The end result is the same in either case in terms of correctly positioning the nosepiece suspension frame 13 relative to the spectacle frame.

As shown in FIG. 3, the arms 16 may be bent forwardly or rearwardly by the optometrist to further customize the support, and the point of bending of the arms 16 may occur below or above the bending point in FIG. 3 to satisfy particular needs.

Following the installation of the suspension frame 13 and the adjustment thereof on the spectacles, the nosepiece proper designated 20 in the drawings is installed and adjusted. The nosepiece 20 is formed of a suitable thermoplastic and its nose-engaging plate portion 21, FIG. 6, is initially flat and is formed by the optometrist at the time of installation to custom-shape the plate element 21 to the curvature of the bridge portion of the nose of a particular wearer. Heat can be applied to the nosepiece 20 during the custom-forming of the plate portion 21.

The nosepiece 20 further comprises on its rear side a projecting lug 22 having claws 23 which may receive between them with a snapping action the lower horizontal cross bar 24 of suspension frame 13. The lug and claws are snugly engaged between the fixed collars or stops 15.

At the time of such installation, the optometrist can rotate the nosepiece 20 around the axis of bar 24, FIG. 3, to impart to it a customized angle relative to the suspension frame 13 to meet the exact fit and comfort needs of a particular wearer. After such angular adjustment, the claws 23 may be pinched together on the bar 24 with the application of heat to lock the nosepiece 20 relative thereto in the optimum adjusted position. The previously-described bending adjustment of the frame 13 and angular adjustment of the nosepiece 20 enables the optometrist to fit the nosepiece assembly 11 almost perfectly to each person.

As shown in FIG. 7, an optional preferably removable and washable cushion boot 25 of suitable foam plastic or fabric can be provided as a covering on the nosepiece plate portion 21.

The advantages of the invention should now be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A customized nosepiece assembly for spectacles comprising a wire U-frame having spaced parallel upstanding arms trimable to required lengths and adapted to be fixed to the nose bridge portion of the spectacle frame between the lenses thereof, the U-frame having a bottom transverse bar attached to said arms at their lower ends and spanning a space between the spectacle lenses below the nose bridge portion, a nosepiece formed as a unit of thermoplastic material and being formable to the natural contours of the nose of the user, the nosepiece including on its forward side claws adapted to receive between them said bottom transverse bar, and said claws after rotational adjustment of the nosepiece on the bottom transverse bar adapted to be formed and clenched around such bar to lock the nosepiece in a selected adjusted position.

2. A customized nosepiece assembly for spectacles as defined in claim 1, and a pair of spaced positioning elements on the bottom transverse bar adapted to receive between them said claws and preventing lateral displacement of the nosepiece on said U-frame.

3. A customized nosepiece assembly for spectacles as defined in claim 2, and the nosepiece including an oval plate-like body portion, and a covering of cushioning material detachably mounted on the plate-like body portion.

* * * * *